July 11, 1961
E. L. LAUNDER
2,991,569
HIGH TEMPERATURE FASTENER CONSTRUCTION
Filed Feb. 6, 1959
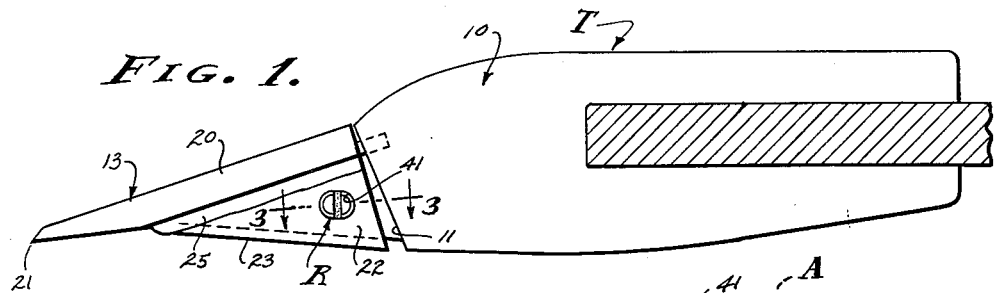
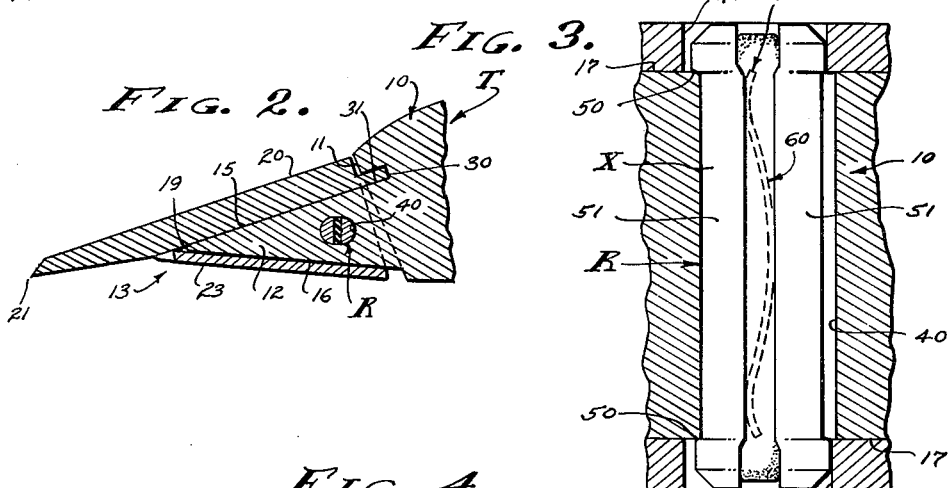
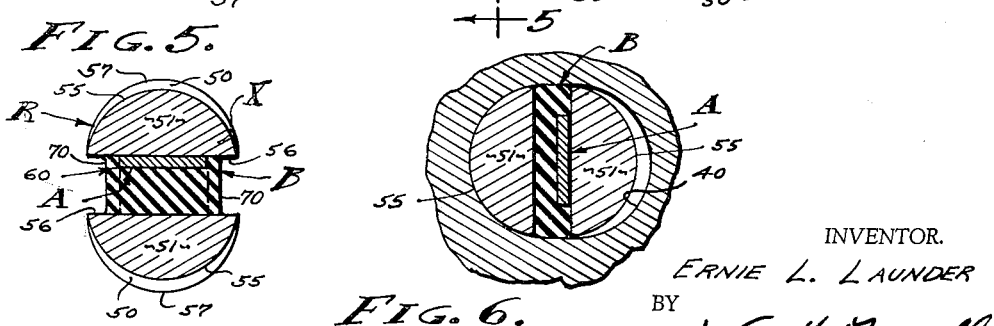
INVENTOR.
ERNIE L. LAUNDER
BY
Wm. H. Maxwell
AGENT

United States Patent Office 2,991,569
Patented July 11, 1961

2,991,569
HIGH TEMPERATURE FASTENER
CONSTRUCTION
Ernie L. Launder, Montebello, Calif., assignor to H. & L.
Tooth Company, Montebello, Calif., a corporation of
California
Filed Feb. 6, 1959, Ser. No. 791,712
7 Claims. (Cl. 37—142)

This invention relates to a fastener construction wherein parts are joined thereby and are subjected to high temperatures, and it is a general object of the invention to provide a practical and dependable fastener or joint construction for use under high temperature conditions and which is characterized by a retainer of the pin unit type that is easily applied and removed, and which is effective to yieldingly urge the joined parts into a pressured engagement.

An object of the invention is to provide a fastener in which two like metal sections are joined in a unitary device so that they have limited universal movement relative to each other. In the fastener of the present invention the metal sections are not only alike, generally, but are elongate in form and have like end portions, and a coupling body of rubber-like material between the metal sections enclosing a spring member and connects them so that they present a unit of construction.

Another object of the invention is to provide a pin-type fastener of the general character referred to involving like metal sections and a spreader means or spreader bar between the sections, the spreader means being such as to operate reliably to urge the parts in opposite directions even when subjected to high temperature operating conditions.

It is a further object of this invention to provide a pin-type fastener of the general type referred to which is such that it can be readily driven into and out of operating position where it connects relatively movable parts and which dependably remains in operating position unless deliberately pressed or driven therefrom. A feature of the fastener provided by the present invention is that the elements and means thereof substantially occupy and fill the fastener receiving holes in the parts being connected so that it will dependably remain in operating position and so that it can be readily loosened or dislodged when it is desired to release and remove the fastener.

A further object of the invention is to provide a fastener of the general character referred to which is simple in construction, which can be easily and quickly operated, and which is so engaged with the said parts to be joined as to normally yieldingly urge the parts in opposite directions.

Another object of the invention is to provide a simple, unitary, drive pin that connects the parts and which is strong and effective, and which involves spreader means that acts under high temperature working conditions to maintain the assembly tight and free of play or looseness such as might result in wear.

A further object of the invention is to provide a locking pin or fastener for connecting relatively movable parts, which pin is characterized by like elongate symmetrical metal sections universally movable relative to each other and combined with a spreader preferably in the form of a leaf spring acting between the sections and normally yieldingly holding them in a predetermined relation to each other and in pressure engagement with the connected parts.

The present invention is applicable to or can be incorporated in various structures or machines and can be used in most situations where ordinary bolts or like fasteners are now employed. Without in any way limiting or restricting the range of use of the invention, I will refer to a typical field of use, so that the universal nature of the invention will be fully understood.

A typical use or application of the invention occurs in digging or excavating machinery where teeth, bucket parts, and elements generally are required to be secured together. A construction employing the present invention may include a part in the form of a shank projecting from a bucket or implement and having a forwardly tapered or diverging tip at its leading end. A second part may be a cap engaged over the tip. A third part, or retainer, in the form of a pin is engaged through the cap and tip and involves a laminated or sectional construction comprising two like metal sections, each substantially semi-circular in cross-section, and a spreader means arranged therebetween. Heretofore, and as set forth and claimed in Patent No. 2,669,153, a spreader means in the form of a body of rubber is arranged between the two semi-circular pin sections, and although such a fastener unit is effective under ordinary operating conditions, it is inoperative when subjected to high temperature conditions. Obviously, rubber will burn, and even when subjected to relatively low temperatures it will lose its elasticity that is required according to the teaching of said prior patent.

The prior art suggests mechanical springs in place of said body of rubber, but it has been found that mechanical devices, such as springs, become inoperative when subjected to normal operating conditions. That is, digging or excavating teeth and bucket parts are packed with dirt and earthen formations, or the like, and said dirt is packed into corners, cavities, and recesses under the high working pressures that are involved. Since the packed material, or dirt, is a substantially incompressible fluid it fills in around parts to prevent them from shifting and, for example, the packed material will flow into a recess occupied by a spring and will surround said spring so that it cannot operate. Also, packed material can prevent the pin sections from moving relative to each other. In other words, cavities are filled with packed material which, in many cases, acts detrimentally, such as to pack between and encase parts of fastening structures of the type under consideration and rendering them ineffective.

In Patent No. 2,669,153 the body of rubber occupies the space between the pin sections and said rubber is subject to deterioration when subjected to heat. Since it is advantageous to entirely occupy spaces, such as recesses and the like, the present invention employs a body of heat-resistant rubber-like material to occupy space and to house or enclose a separate spreading means in the form of a metallic spring member. In this way the entire space occupied by the fastener is taken up and with the result that packed material cannot enter therein, or be packed therein, to adversely affect or hinder operation of the parts involved.

The various objects and features of my invention will be fully understood from the following detailed description of a typical preferred form and application of the invention, throughout which description reference is made to the accompanying drawings, in which:

FIG. 1 is a side elevation of an earth digging implement involving a tooth secured to an adapter by means of the high temperature fastener that I provide. FIG. 2 is a longitudinal sectional view of a portion of the structure shown in FIG. 1. FIG. 3 is a transverse sectional view and taken as indicated by line 3—3 on FIG. 1. FIG. 4 is an enlarged detailed sectional view of the pin-type fastener of the present invention, and FIGS. 5 and 6 are enlarged sectional views of the fastener, FIG. 5 being taken as indicated by line 5—5 on FIG. 4 and FIG. 6 being of the pin in working position as shown in FIG. 2.

The structure provided by this invention is applicable to and can be used to advantage in connection with a digger tooth and cap and it will be described in this particular connection. It is to be understood, of course, that as the invention is adapted to or incorporated in various other machines or equipment it may be modified or varied as circumstances require. In the drawings a tooth T is shown as involving a forwardly projecting shank 10 with a flat front face 11 and a tip 12 projecting forward from the face of the shank. A cap 13 is applied to or over the tip of the shank and a retainer R in the form of a pin releasably secures the cap in operating position on the tip.

In the preferred form of construction the shank 10 and tip 12 form a rigid unitary element. The tip in this particular case is one main element of the structure and is forwardly convergent or tapered and in the form illustrated it involves a flat forwardly extending top 15, a flat forwardly extending bottom 16 and flat parallel sides 17. The top 15 and bottom 16 converge and come together or terminate at a forward point 19.

The cap 13, which is another main part, may vary widely in form and construction, it being preferably a unit which is applied to and which encases the tip 12. In the case illustrated the cap 13 involves a top or blade 20 with a forwardly projecting portion having a sharpened edge 21. The blade 20 is arranged over and bears on the top 15 of the tip. Sides 22 depend from the edges of the blade 20 and fit over or against the sides 17 of the tip. It is preferred that the sides or cheeks 22 of the cap be made the same size and shape as the sides 17 of the tip to be coextensive therewith, as shown throughout the drawings. A bottom 23 joins or extends between the lower edge portions of the cheeks 22 and bears on or fits against the bottom 16 of the tip.

In practice, the tip above described is a fabricated element or unit, the bottom and cheeks being formed of a sheath, shaped and bent in the described manner, and the upper edges of the cheeks 22 are permanently or rigidly joined to the blade 20 as by welding, or the like. In the drawings welding material is shown at 25 permanently bonding the cheeks 22 to the blade 20. In the particular case illustrated a tongue 30 projects from the rear or inner end of blade 20 and extends into a suitable socket 31 provided in the front face 11 of the shank 10 immediately above the tip.

The retainer R provided by the present invention is in the nature of a pin and to accommodate the retainer a transverse opening 40 is provided through the tip 12 from one side thereof to the other, and openings 41 are provided in the cheeks 22 of the cap and communicate with the opening 40 in the tip when the cap is in place on the tip. It is preferred that the bore or opening 40 through the tip be elongated somewhat in cross sectional configuration in the direction in which the tip extends or projects from the face 11, and as shown throughout the drawings, the openings 41 in the cheeks 22 may be likewise elongated in cross section.

The retainer pin R provided by the invention is an elongate unit engageable with or applicable to the assembled cap and tip, as by driving, and when in place or operating position it extends through both the cap and the tip and has a body portion X carried or engaged in the opening 40 of the tip while head portions Y engage in or are carried by the openings 41 in the cheeks 22. In accordance with the invention the heads Y of the pin are in the nature of enlargements on the ends of the body portion X forming inwardly facing or opposed shoulders 50 which engage the sides 17 of the tip when the pin is in place (see FIG. 3).

The pin R is a fabricated or sectional structure preferably involving two like metal sections 51, a spreader means A, and a coupling means B that occurs between the metal sections. The metal sections are preferably alike and extend longitudinally of the pin and each has an outer convex face 55 and an inner flat face 56. In the preferred construction the faces 55 and 56 are so shaped and proportioned that the body portion of each metal pin section is substantially semi-circular in cross sectional configuration, as shown in FIG. 5. The head portion Y of each metal pin section has a convex outer face 57 and an inner face substantially continuous with the inner face of the body section. In the particular case illustrated the flat inner sides 58 of the heads are slightly offset outwardly from the flat face 56 of the body portions. The head portions 57 project from the body portions of the pin sections to establish the opposed shoulders 50 and these shoulders are spaced apart to receive or accommodate the tip in the manner shown in the drawings.

The spreader means A normally yieldingly holds the metal sections of the pin apart in spaced parallel relationship and in the preferred form of the invention it involves a spring member 60 of tempered steel, or the like, operatively engaged between the flat inner faces of the metal pin sections. The spring member 60 can vary widely in form and design and when it is extended it serves to hold the pin sections a maximum distance apart, and is resilient so that when the pin sections are moved together the spring member is compressed. The member 60 is resilient and is preferably a leaf spring or bar-shaped element curved or arcuate in configuration with a center portion 61 engaged with the flat inner face of one pin section at the center portion thereof, and with opposite end portions 62 and 63 engaged with the flat inner face of the other pin section at opposite end portions thereof (see FIG. 4). In practice, the end portions 62 and 63 are turned or bent so as to present a convex surface for engagement with the face of the pin section. It will be apparent that the leaf spring member 60, which is preferably flat and rectangular in cross section, is flattened or straightened when the pin sections are urged together or toward each other.

The coupler means B holds the metal sections of the pin together and in the preferred form of the invention it is a body or strip of plastic or rubber-like material, or the like, confined between the flat inner faces of the metal pin sections and which surrounds the resilient spring member 60 of the means A. When I use the term "rubber-like material," I mean to include any compositions or combination of materials that may have the elasticity of rubber or that will serve to yield under pressure as will a pad of rubber. For example, I employ a body of heat resistant material that will retain the required desirable characteristics within the operational range of temperatures involved. It is preferred to permanently bond the coupler means B to the metal sections of the pin so that these parts form a permanent or unitary assembly.

As shown, the sides 70 of the said body are normally spaced inward of the opposite edges of the pin sections. By making the coupler or pad of rubber-like material substantially coextensive with the flat inner sides of the metal section, the pin, when in place, and compressed and expanded, completely occupies the openings in the connected parts and thus eliminates entry or fouling by foreign matter or dirt that might otherwise be forced by pressure to enter the interstices in the structure.

In the preferred form of the invention the outer end corners 54 of the pin are preferably bevelled or dressed away to facilitate entrance of the retainer pin R into the openings 40 and 41. Further, the outer ends 53 of the heads on the metal sections are preferably flat and in planes normal to the longitudinal axis of the pin so they form faces for receiving a hammer or other driving tool.

The retainer R constructed as above described and as clearly illustrated in the drawings, particularly FIG. 4 of the drawings, is applied after the cap 13 has been engaged over the tip 12. The pin is introduced from one side of the structure, that is, through one of the holes 14 in the cap and the parts are so arranged and proportioned that for complete introduction of the pin it must be forced or driven into place in the course of which operation it passes through the opening 40 in the tip and finally projects into the other or opposite opening 41 in the cap. In accordance with the invention the spring member 60 of the spreader means A is surrounded by the body of rubber-like material comprising the coupler means B, the member 60 being imbedded in said body of material so that it is permanently retained in working position. With a preferred relationship of parts the end faces 53 of the pin sections are flush with the outer faces of the cheeks 22 when the pin is in working position.

As the pin is driven or forced into place the resilient spreader means A thereof is deflected putting the spring member 60 under tension so that it normally yieldingly urges the metal sections of the pin apart. Also, when the pin is in place the coupler means B thereof is compressed or deformed, putting the body of rubber-like material under pressure so that it flows laterally at both sides of the retainer pin R to completely fill and occupy the space between the metal sections of the pin and from wall to wall of the openings that receive the pin (see FIG. 6). When the pin is in place, as shown in FIG. 3 of the drawings, it bears against the forward wall of opening 40 and bears against the rear walls of the openings 41 and thus exerts pressure on the tip and cap, as caused by the resilient spring 60. The parts are held securely or tightly engaged or wedged together and the pin will remain in operating position due to the shoulders 50 engaging the sides 17 of the tip. The shoulders 50 are made of such extent or shape as to effectively maintain the pin in position under working conditions. Since the body of rubber-like material of the coupler B expands when it is compressed, and occupies the openings, there will be no voids or interstices and, therefore, materials cannot enter the structure to affect or hinder operation of the elements thereof. As a result it is always possible to apply sufficient force or pressure to the pin, as by driving to dislodge it when necessary, and this can be done by striking the pin with a hammer, or the like.

Having described only a typical preferred form and application of my invention, I do not wish to be limited or restricted to the specific details herein set forth, but wish to reserve to myself any modifications or variations that may appear to those skilled in the art and fall within the scope of the following claims.

Having described my invention, I claim:

1. A retainer pin of the character described and including, a pair of spaced elongate metal sections extending longitudinally of the pin, a spreader means comprising a resilient member extending between and engaged with the sections to urge them apart, and a coupler means between the sections to join them together, the metal sections being adapted to be moved together against the resilient member and whereby said coupler means is compressed to fill the space remaining between the sections.

2. A retainer pin of the character described and including, a pair of spaced elongate metal sections extending longitudinally of the pin, a spreader means comprising an elongate resilient member arched between the sections to urge them apart, and a coupler means between the metal sections to join them together, the resilient member being in the form of a spring with portions thereof engaged with the two metal sections respectively, the metal sections being adapted to be moved together against the spring member whereby said coupler means is compressed to fill the space remaining between the sections.

3. A retainer pin of the character described and including, a pair of spaced elongate metal sections extending longitudinally of the pin, a spreader means comprising an elongate resilient member arched between the sections to urge them apart, and a coupler means between the metal sections to join them together, the resilient member being in the form of a spring with a center portion engaged with one section and with opposite end portions engaged with the other section, the metal sections being adapted to be moved together against the spring member whereby said coupler means is compressed to fill the space remaining between the sections.

4. A retainer pin of the character described and including, a pair of spaced elongate metal sections extending longitudinally of the pin, a spreader means comprising a resilient member extending between and engaged with the sections to urge them apart, and a body of elastic material between the sections to join them together and said material surrounding said resilient member and adhered to the spaced sections, the metal sections being adapted to be moved together against the resilient member and whereby said body of elastic material is compressed to fill the space remaining between the sections.

5. A retainer pin of the character described and including, a pair of spaced elongate metal sections extending longitudinally of the pin, a spreader means comprising an elongate resilient member arched between the sections to urge them apart, and a body of elastic material between the metal sections to join them together and said material surrounding said resilient member and adhered to the spaced sections, the resilient member being in the form of a spring with a center portion engaged with one section and with opposite end portions engaged with the other section, the metal sections being adapted to be moved together against the spring member whereby said body of elastic material is compressed to fill the space remaining between the sections.

6. In combination, two parts engaged for relative movement and having registering openings through them in a direction normal to that of the movement, and an elongate fastener extending through the openings and including, a pair of spaced elongate metal sections extending longitudinally of the fastener, a spreader means comprising a resilient member extending between the metal sections to engage them and to urge them apart, and a coupler means between the sections to join them together, the metal sections being adapted to move together against the resilient member and whereby said coupler means is compressed to occupy the openings in the parts between the two sections, one section having a middle portion bearing against a part in one direction and the other section having spaced portions bearing against a part in the opposite direction.

7. In combination, two parts engaged for relative movement and having registering openings through them in a direction normal to that of the movement, and an elongate fastener extending through the openings and including, a pair of spaced elongate metal sections extending longitudinally of the fastener, a spreader means comprising a resilient member extending between the metal sections to engage them and to urge them apart, and a body of elastic material between the sections to join them together and said material surrounding said resilient member and adhered to the spaced sections, the metal sections being adapted to move together against the resilient member and whereby said body of elastic material is compressed to occupy the openings in the parts between the two sections, one section having a middle portion bearing against a part in one direction and the other section having spaced portions bearing against a part in the opposite direction.

References Cited in the file of this patent

UNITED STATES PATENTS

| | | |
|---|---|---|
| 1,916,856 | Copeman | July 4, 1933 |
| 2,568,075 | Launder | Sept. 18, 1951 |
| 2,762,139 | Launder | Sept. 11, 1956 |
| 2,763,379 | Danielson | Sept. 18, 1956 |

FOREIGN PATENTS

| | | |
|---|---|---|
| 683,950 | France | Mar. 10, 1930 |